United States Patent [19]

Ligutom

[11] 3,742,682
[45] July 3, 1973

[54] OLAN SMOG DEVICE
[76] Inventor: Angelo Y. Ligutom, 808 N. Herbert Avenue, Los Angeles, Calif. 90063
[22] Filed: Mar. 19, 1971
[21] Appl. No.: 126,011

[52] U.S. Cl.......... 55/223, 55/229, 55/244, 55/260, 55/DIG. 30, 261/115
[51] Int. Cl............................. B01d 47/02
[58] Field of Search............... 55/223, 240, DIG. 30, 55/244, 260, DIG. 20, 229, 233, 239; 261/115, 118

[56] References Cited
UNITED STATES PATENTS
3,353,336   11/1967   Caballero.............. 261/18 R X
3,656,280   4/1972   Perry..................... 55/240
3,559,379   2/1971   Lambert............... 261/118 X FOREIGN PATENTS OR APPLICATIONS
500,396   11/1954   Italy...................... 261/118

Primary Examiner—Tim R. Miles
Assistant Examiner—William Cuchlinski, Jr.
Attorney—Robert K. Rhea

[57] ABSTRACT

A liquid containing baffle equipped scrubbing device for treatment of effluent gases is interposed in the exhaust pipe of an internal combustion engine. The scrubbing action is achieved by a pump circulating water through spray forming tubing intersecting the path of exhaust gas flow.

3 Claims, 5 Drawing Figures

ANGELO Y. LIGUTOM
INVENTOR.

BY
Robert K. Rhea
AGENT

ANGELO Y. LIGUTOM
INVENTOR.

BY
Robert K. Rhea
AGENT

OLAN SMOG DEVICE

BACKGROUND OF THE INVENTION

1. Field of the invention

The present invention relates to an apparatus for treatment of effluent gases from internal combustion engines.

Automotive exhaust gas contains a mixture of carbon monoxide, carbon dioxide, unburned hydrocarbons and other impurities, such as nitrogen or nitrogen oxides. Such automotive exhaust gases tend to accumulate in the atmosphere and react to sunlight to form "smog" injurious to life of all forms.

2. Description of the Prior Art

Prior attempts to reduce the unburned hydrocarbons and carbon monoxide contained in automotive exhaust gases have been directed toward "after burners" for direct burning of undesirable materials with excess air at relatively high temperatures or catalytic converters for catalytically oxidizing or burning which action is accomplished at a lower temperature than the "after burner" method. Other means for treating the effluent exhaust gas includes the concept of baffle equipped housings which direct the gases toward a contained liquid for reducing the temperature of the gas and intermingling with liquid vapor.

Examples of this type of exhaust gas treatment is disclosed by U.S. Pat. Nos. 3,340,859 and 3,383,854.

The principal distinction of this invention over these patents is that engine exhaust gases entering a tank are directed downwardly and then passed upwardly through a liquid spray for commingling of gas impurities with water molecules before being exhausted from the other end of the device.

SUMMARY OF THE INVENTION

This invention includes a scrubber tank having a bottom, sides and a top provided with a gas inlet and outlet. The inlet is connected to the engine exhaust pipe. The tank contains a desired quantity of liquid, such as water. A perforated length of tubing forms a loop longitudinally of the tank intermediate its height. A motor driven pump, located externally of the tank, is connected with the tubing for circulating the liquid and forming a spray adjacent the upper limit of the tank. A foraminated metallic sheet extends horizontally within the confines of the tubing loop. A downwardly and rearwardly projecting baffle, adjacent the exhaust gas inlet, directs the gases downwardly toward the level of the water so that the gases flow upwardly through the foraminated sheet and water spray before being discharged through the exhaust outlet.

The principal object of this invention is to provide an apparatus for neutralizing and removing poisonous components suspended in the exhaust gas stream.

DESCRIPTION OF THE PREFERRED EMBODIMENT

Figure 1:
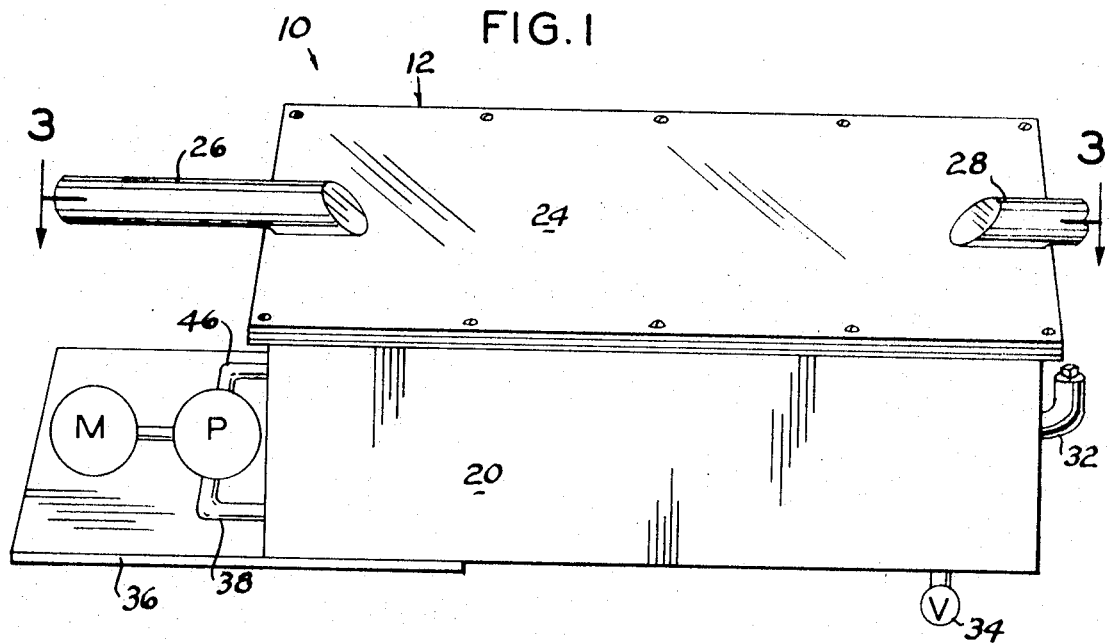
FIG. 1 is a perspective view of the device, per se.

Like characters of reference designate like parts in those figures of the drawings in which they occur.

The reference numeral 10 indicates the device, as a whole, generally rectangular in overall configuration. The device 10 comprises a housing or tank, indicated generally at 12, and including end walls 14, 16 and side walls 18, 20 joined to a bottom 22. The tank is closed by a removable gasket equipped horizontal top 24. The top 24 is provided at one end with a gas exhaust inlet pipe 26 and at its other end with a gas exhaust outlet pipe 28, each communicating with the interior of the tank. The tank 12 is adapted to contain a quantity of liquid 30 which is placed therein through a filler fitting 32 connected with the tank rear wall 16. A drain valve 34, connected with the tank bottom 22, permits removal of the fluid for its replacement. A motor M, drivably connected with a pump P, is supported by a platform 36 secured to the bottom surface of the tank bottom 22 and projecting forwardly of the tank end 14. An elongated length of tubing 38 is connected at one end to the outlet of the pump P and extended through a suitable aperture in the tank wall 14. The other end portion of the tubing 38 is deformed to describe a substantially rectangular closed loop 40 extending along the inner surfaces of the opposing side walls 18 and 20, end wall 16 and in rearwardly parallel spaced relation with respect to the forward wall 14. The loop 40 is disposed in a horizontal plane and supported by a plurality of brackets 42 secured to the side walls 18, 20 and rear wall 16 in downwardly spaced relation with respect to the lower surface of the tank top 24. The wall of the tubing forming the loop 40 is provided with a longitudinally spaced-apart row of orifices 44 for discharging water to form a spray which is directed inwardly and upwardly of the sides and ends of the loop 40.

A pump pick-up or liquid inlet tube 46 is connected at one end with the pump inlet and extends through the front wall 14 with its other end opening below the level of the fluid 30 within the tank. A rectangular relatively thin foraminated metallic sheet 48 is encompassed by the tubing loop 40 and suspended by the brackets 42.

A downwardly and rearwardly directed baffle 50 is transversely connected to the depending surface of the top 24 rearwardly of the exhaust inlet. The depending edge of the baffle 50 is horizontally disposed below the plane of the loop 40 and sheet 48 for the purpose of directing the flow of exhaust gases downwardly toward the level of the fluid 30 before flowing upwardly through the sheet 48. The sheet 48 is provided with a longitudinally spaced-apart pair of baffle-like panels 52 similarly foraminated and extending rearwardly and downwardly terminating in spaced relation with respect to the level of the fluid 30 for insuring even dispersion of exhaust gases flowing upwardly through the foraminated sheet 48.

OPERATION

Figure 3:
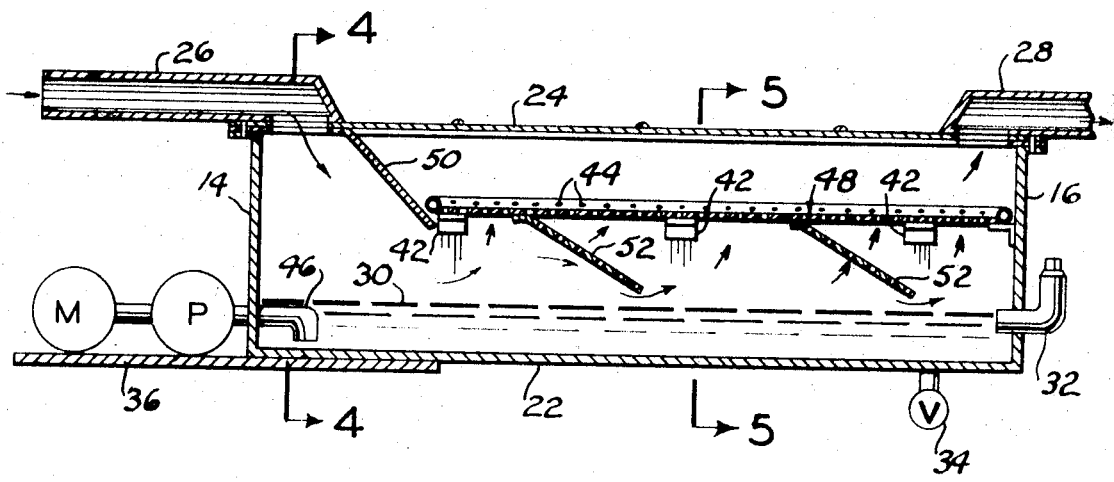
FIG. 3 is a vertical cross-sectional view taken substantially along the line 3—3 of FIG. 1; and, FIGS. 4 and 5 are vertical cross-sectional views taken substantially along the lines 4—4 and 5—5, respectively of FIG. 3.
Figure 2:
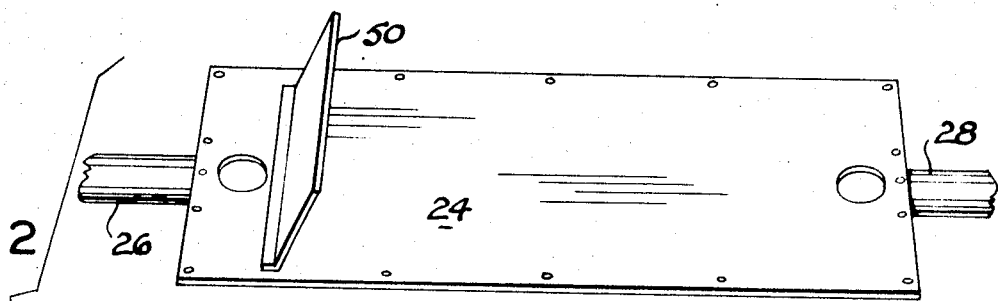
FIG. 2 is a view similar to FIG. 1 illustrating the tank top in exploded inverted position.
Figure 4:
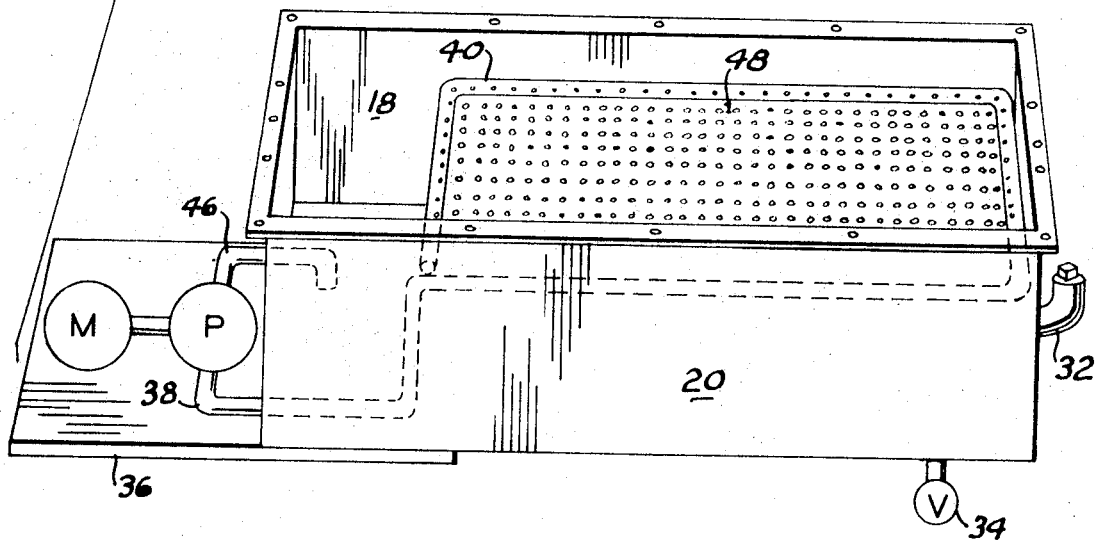
Figure 4:
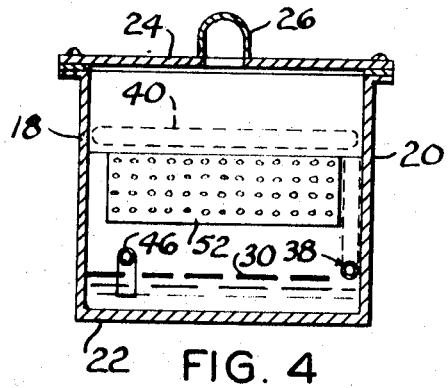
Figure 5:
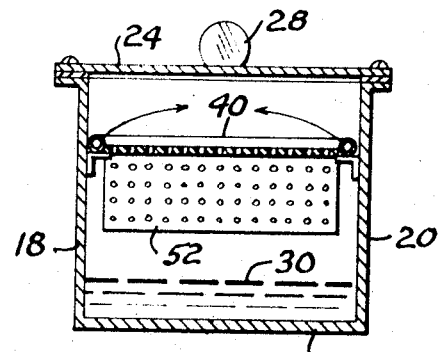

In operation the motor M is connected with the ignition system so that the pump P is operated to form the water spray when the engine is started. The exhaust gas flows through the inlet 26 and is deflected downwardly by the baffle 50 to be dispersed by the panels 52 before flowing upwardly through the foraminated sheet 48 in the direction of the arrows (FIG. 3) through the water spray before exhausting through the gas outlet 28. Directing the exhaust gas toward and across the surface of the fluid results in cohesion of fluid molecules with some of the impurities in the exhaust gas without the spray action of the fluid. The fluid 30 is periodically replaced, through the filler tube 32, at selected intervals depending upon the frequency of use. The fluid is drained through the drain valve 54 and replaced with a fresh supply.

Obviously the invention is susceptible to changes or alterations without defeating its practicability, therefore, I do not wish to be confined to the preferred embodiment shown in the drawings and described herein.

I claim:

1. An exhaust gas scrubber, comprising:
   a tank having a bottom, side walls, forward and rearward end walls and a top and containing a quantity of liquid;
   a gas exhaust inlet pipe connected with said top at one end of said tank;
   a gas exhaust outlet pipe connected with the other end of said top and discharging exhaust gas to the atmosphere;
   an elongated tube within said tank forming a horizontally disposed loop adjacant the inner surfaces of said sides and the rearward end of said tank in parallel spaced relation rearwardly of said forward end and above the liquid level,
   said loop having a longitudinally spaced row of orifices for directing a liquid spray inwardly and upwardly of the loop;
   pump means connected with said tubing for circulating the liquid;
   a horizontally disposed foraminated sheet surrounded by that portion of said tubing forming the loop and intersecting the exhaust gas stream; and,
   baffle means within and extending tranversely of said tank for directing the steam of exhaust gases toward the level of the liquid.

2. The exhaust gas scrubber according to claim 1 in which said baffle means includes:
   a baffle connected with the inner surface of said top adjacent said inlet pipe and extending angularly downward and rearwardly and terminating in a horizontal plane between the level of the fluid and the plane of the tubing forming the loop.

3. The exhaust gas scrubber according to claim 2 in which said baffle means further includes:
   at least one foraminated panel connected with the depending surface of said foraminated sheet and extending downwardly and rearwardly toward the level of the liquid.

* * * * *